United States Patent [19]

Sanderson

[11] Patent Number: 5,404,672

[45] Date of Patent: Apr. 11, 1995

[54] MODULAR COLUMN PLANTER

[75] Inventor: Kenneth L. Sanderson, Elgin, Ill.

[73] Assignee: Duraco Products, Inc., Streamwood, Ill.

[21] Appl. No.: 177,319

[22] Filed: Jan. 4, 1994

[51] Int. Cl.⁶ ............................................. A01G 25/00
[52] U.S. Cl. .......................................... 47/82; 47/83; 47/39
[58] Field of Search ................................ 47/82, 83, 39

[56] References Cited

U.S. PATENT DOCUMENTS

| D. 207,915 | 6/1967 | Zimmermann | 47/83 |
| 297,932 | 4/1884 | Groves et al. | 47/82 |
| 3,293,798 | 12/1966 | Johnson, Sr. | 47/83 |

FOREIGN PATENT DOCUMENTS

| 2386250 | 12/1978 | France | 47/82 |
| 144061 | 12/1935 | Germany | 47/83 |
| 2704414 | 9/1978 | Germany | 47/82 |
| 2819546 | 11/1979 | Germany | 47/82 |

Primary Examiner—Ramon S. Britts
Assistant Examiner—Joanne C. Downs
Attorney, Agent, or Firm—John L. Schmitt

[57] ABSTRACT

A modular column planter, particularly adapted for household use, comprises a lower, middle and upper container. Each container has a bottom connecting with a sidewall that extends upwardly to define a top opening. On the lower container bottom is a post having a slotted, top retaining cup. Positioned about an opening in a bottom of the middle and upper container is an upright, hollow column and a lower column extension. A top edge of the middle container column is notched while a bottom edge of the upper container lower column extension is slotted. The planter is formed by fitting respectively the bottom of the middle and upper container in the top opening of the middle and upper container. As located, the middle container column extension fits into the lower container retaining cup and the upper container column extension fits into the middle container column upper end. These now joined columns form a watering tube. To align the respective watering tube notches and slots and hold containers together, fastening cams on the middle and upper container form twist-and-lock fits with locking slots in the lower and middle container sidewall. Soil in the lower and middle containers is moistened by filling the watering tube which then discharges to plants growing outward through openings in the sidewalls of these containers.

10 Claims, 2 Drawing Sheets

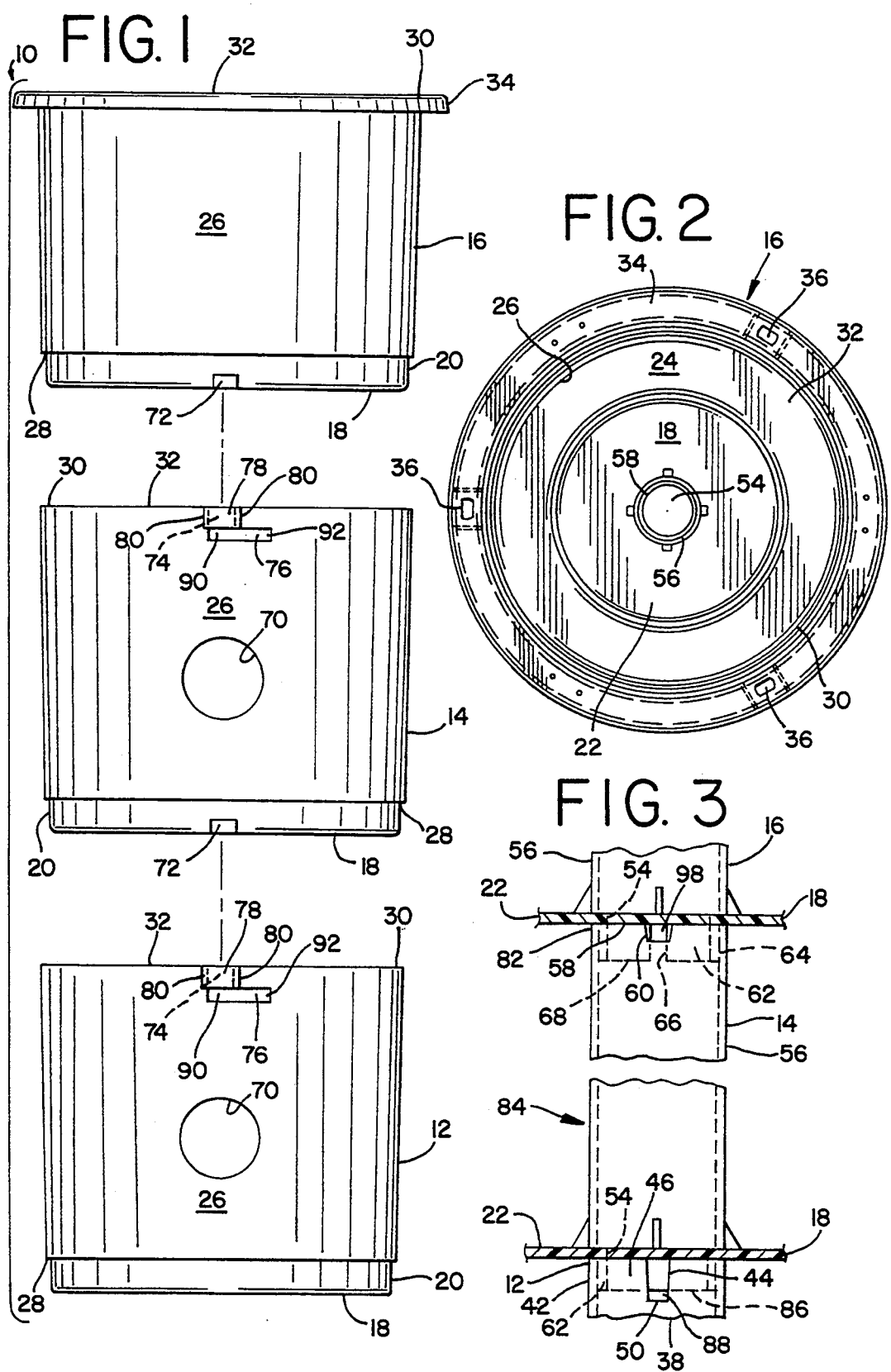

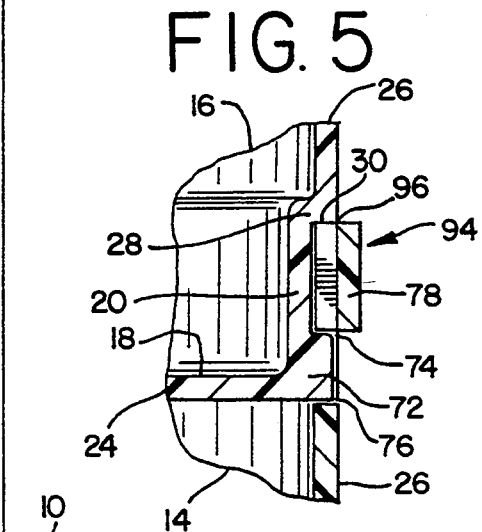
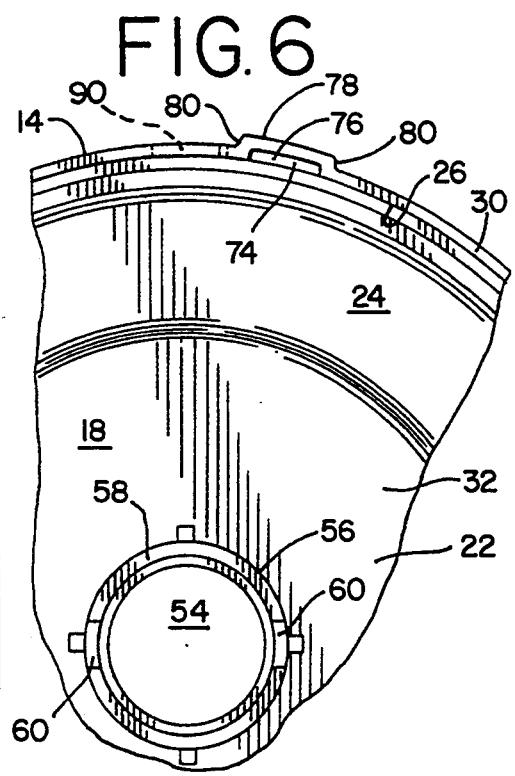

MODULAR COLUMN PLANTER

BACKGROUND OF THE INVENTION

1. Field of the Invention

This invention relates to planters for household-type plants and more particularly to a column planter comprising three connectable container modules which when joined form a watering tube for moistening soil in the lower two containers.

2. Prior Art

Stacking containers to produce varying plant displays is well known and in use for many years. U.S. Pat. No. 4,057,931 shows one arrangement wherein a free standing container has a lower support ring formed with a series of selectively spaced recesses. This container may be stacked onto a pair of lower containers by inserting upper rims of the lowers containers into the recesses of the upper container lower support ring.

Planters comprising a series of stacked plant containers connected by means for distributing water to lower containers in the stack also are well known. U.S. Pat. No. 3,293,798 shows a free standing planter comprising a series of flat, conical-like shaped planting sections supported respectively on soil in the next lower section. A perforated tube then extends through an opening in a bottom of each section allowing water to flow down to the various sections. Any excessive moisture in an upper section additionally may drain downward through perforations in an angular sidewall of that section to the soil in the next lower section.

Another free standing planter comprises a series of vertically stacked plant containers is disclosed in French Patent No. 2 386 250. A watering tube extends downward from an upper reservoir through an opening in a bottom of each container.

Another vertical potting arrangement is shown in French Patent No. 2 276 775. In this case the planter is divided into an upper and a lower section by a dish-shaped partition. Soil in the lower section receives water through a drain tube. A top inlet end of this tube is carried by a socket in a removable perforated cover fitting in a top opening of the upper section.

SUMMARY OF THE INVENTION

A modular column planter of this invention is particularly adapted for raising household-type plants. The planter comprises a lower, a middle and an upper container that may be selectively joined to form a stacked assembly. Each container has a recessed bottom connecting with a cylindrical sidewall which extends upwardly to define a top opening.

In a middle of the lower container bottom is a centrally located post formed with a top retaining cup. In a sidewall of this cup is a slot. In a similar manner, a hollow column extends upwardly from and about an opening in the bottom of the middle and upper container. In an upper end of the middle container column is a pair of oppositely positioned notches. Aligned with each column and extending below the bottom of the middle and upper container is a lower column extension. In a bottom edge of the upper container column extension is a slot.

For use the containers are filled with soil. Plants rooted in the soil in the lower and middle containers have foliage portions that grow outwardly through openings in the sidewall of these containers. Plants rooted in the soil in the upper container grow upwardly from its top opening.

To assemble the containers into the column planter, the recessed bottom of the middle and upper container are fitted respectively into the top opening of the lower and middle container. Concurrent with this placement, the lower column extension of the middle container fits into the retaining cup of the lower container, and the lower column extension of the upper container fits into the upper end of the middle container column. As joined, the columns form a watering tube in the planter.

To maintain the containers in this stacked relationship, a rim of the bottom of the middle and upper container each includes a set of fastening cams. These cams first are aligned with and then inserted downward into respective vertical sections of sets of L-shaped locking slots formed in a top edge of the sidewall of the lower and middle container. The middle and upper containers then are rotated to slide their respective fastening cams in horizontal sections of the locking slots to form twist-and-lock fits therebetween. When fully rotated, the upper container column extension slot aligns with one of the middle container column notches.

The now assembled planter may be placed free standing on a supporting surface, for example indoors on a bread rack. Alternately, the column planter may be located out-of-doors as a hanging planter supported by attached cording.

To moisten soil in the lower and middle container without disconnecting these containers, the watering tube is filled with water. When the tube is full and the containers are in a full twist-and-lock position, water in the tube flows in like amounts from the notch in the middle container column and from the slot in the lower container retaining cup.

The modular column planter of this invention provides several advantages of over other like known planters as typically discussed above.

A first advantage is that the containers connect to form a planter having a unified structure that provides a one-piece appearance. This structure allows the planter to be free standing or used as a hanging planter. Regardless, the containers remain securely locked together so that the planter may be readily moved to different locations or withstand severe weather when the planter is hung outside, for example.

A second advantage is that the containers of the planter may be readily separated and then stacked and locked together to reform the planter. Initial planting or a replanting is more easily accomplished when the containers are separated.

Another advantage is that when the containers are in a full twist-and-lock position, water in the watering tube flows in substantially equal amounts to the lower and middle container. Thus, like plants in these containers receive like amounts of moisture. Note also that foreign matter may be readily removed from the openings through which the water discharges.

A still further advantage is that the amount of water flowing into the middle container may be selectively reduced which in turn increases flow to the lower container. This change in the rate of flow is effected by rotating the upper container to less than a full twist-and-lock position with respect to the middle container. Different plant varieties, which may have differing moisture needs, may be successfully planted in different containers of the planter.

Lastly, while the containers look alike, each also has distinguishing physical characteristics that identifies which is the upper, the middle and lower container. For example, the upper container has no sidewall openings, and the lower container has no locking cams. Thus, there is little chance of confusion during initial assembly or a reassembly. Additionally, during this assembly there is no need to consider which upper container fastening cam is to fit in which middle container locking slot and no need to consider formation of the watering tube. Regardless, the watering tube is readily formed with the tube then having discharge openings to the lower and middle containers.

DESCRIPTION OF THE DRAWING FIGURES

FIG. 1 is an elevational view of a modular column planter of this invention wherein a lower, a middle and an upper container of the planter have been separated.

FIG. 2 is a plan view of the planter upper container.

FIG. 3 is a cross sectional elevational view of the planter showing a portion of a watering tube formed therein.

FIG. 4 is a cross sectional elevational view of the planter containers seen in FIG. 1.

FIG. 5 is a detailed cross sectional elevational view of a portion of the upper container stacked on the middle container of the planter with a locking cam of the upper container then fitting in a latching slot of the middle container.

FIG. 6 is a detailed plan view of a portion of the middle container of the planter.

DESCRIPTION OF THE PREFERRED EMBODIMENT

A modular column planter of this invention is shown generally in FIGS. 1 and 4 and designated 10. The planter 10 comprises a lower container 12, a middle container 14 and an upper container 16. As best seen in FIG. 4, each container 12-16 has a bottom 18 defined by a vertical rim 20 which is connected to a raised center section 22 by an outer, circular depressed portion 24. The bottom rim 20 is inwardly offset from a cylindrical sidewall 26 of each container 12-16 and joined to such by a horizontal ledge 28.

A top edge 30 of each container sidewall 26 defines a top opening 32. Connecting with the sidewall top edge 30 of the upper container 16 is an outwardly extending lip 34 formed with three equispaced apart openings 36.

In a middle of the lower container bottom center section 22 is a hollow post 38. At an upper end 40 of the post 38 is a retaining cup 42 having an downwardly tapering slot 44 formed in a sidewall 46 of such. A bottom end 50 of this slot 44 terminates above a bottom 52 of the cup 42.

In a middle of the bottom raised section 22 of the middle and upper container 14, 16 is an opening 54. Positioned about each opening 54 is an upright, hollow cylindrical column 56. A top edge 58 of the middle container column 56 has a pair of oppositely located notches 60. Aligned with the opening 54 in the middle and upper container bottom center section 22 and extending therebelow is an lower column extension 62. An outside diameter of each extension 62 is substantially the same as an inside diameter of the columns 56. In a sidewall 64 of the upper container lower extension 62 is a vertical slot 66 which extends from the bottom center section 22 to a bottom edge 68 of the extension 62.

As a first step to use the planter 10, the individual containers 12-16 are filled with soil (not shown). Root portions of selective plants (not shown) then are planted in the soil such that foliage portions of these plants grow out from sidewall openings 70 in the lower and middle container 12, 14. Plants in the upper container 12 are rooted so that their foliage grows upwardly from the container top opening 32.

Next, the bottom 18 of the middle and upper container 14, 16 are fitted respectively into the top opening 32 of the lower and middle container 12, 14. At the same time a pair of fastening cams 72 oppositely positioned on the bottom vertical rim 20 of the middle and upper container 14, 18 are aligned with vertical sections 74 of a pair of L-shaped locking slots 76 formed on opposite sides of the top edge 30 of the lower and middle container sidewall 26. Covering each slot vertical section 70 is an outwardly offset strap 78 having ends 80 joined to and formed as an integral part of each container sidewall 26.

As the containers 12-16 are pressed together, the lower column extension 62 of the middle container 14 slides into the lower container retaining cup 42, and the lower column extension 62 of the upper container 16 slides into an upper end 82 of the middle container column 56. These insertions form the middle and upper container columns 52 into a watering tube 84 for the planter 10.

When the containers 12-16 are pressed together fully, the ledge 28 of the bottom rim 20 of the middle container and upper container 14, 16 seat on the top edge 30 of the sidewall 26 of the lower and middle container 12, 14, see FIG. 5. As now located, a bottom edge 86 of the middle container lower column extension 62 is positioned above the bottom end 50 of the lower container retaining cup slot 44 to effect a selectively sized discharge opening 88, see FIG. 3.

Additionally, when the containers 12-16 are fully pressed together as described above, the fastening cams 72 align with horizontal sections 90 of the locking slots 76. A 20 degree counterclockwise rotation of the upper container 16 with respect to the middle container 14 and like rotation of the middle container 14 with respect to the lower container 12 slides these fastening cams 72 to a closed end 92 of each locking slot horizontal section 90. The containers 12-16 now are locked together by interference fits 94 between the fastening cams 72 and the locking slots 76. As assembled, planter 10 is transformed into a unified structure and appears as one-piece. Note that each parting line 96 at the respective joinders of the container sidewalls 26 is quite fine obscuring observation of such.

Rotation of the containers 14, 16 also aligns the upper container column extension slot 66 with one middle container column notch 60. This alignment creates a further discharge opening 98. Note that the other middle container column notch 60 remains covered by the upper container lower column extension 62. One alignment is effected without regard to which upper container cam 72 fits in which middle container locking slot 76.

Plants in the upper container 16 are watered by adding water to the soil in this container 16 through its top opening 32. Moisture for soil in the lower and middle container 12, 14 is added by pouring water into the watering tube 84. When the watering tube 84 is full, this water discharges in substantially like amounts to the lower container 12 from the retaining cup discharge opening 88 and to the middle container 14 from the notch discharge opening 98.

To decrease the discharge rate of water to the middle container 14 and at the same time increase the flow rate to the lower container 12, the upper container 16 is rotated clockwise, for example 10 degrees, with respect to the middle container 14. This rotation produces a partial misalignment between the upper container column extension slot 66 and the middle container column notch 60. Because of the now reduced opening size, less water flows into the middle container 14. At the same time more water flows into the lower container 12. This amount of rotation, however, is not sufficient to allow the upper container fastening cams 72 to disengage from the middle container locking slots 76.

If a container 12-16 were to receive an excessive amount of water, that water collects in the bottom depressed portion 24 of that container. The bottom raised center section 22 insure that at least part of the plant root structure remains free from excessive moisture.

As noted earlier, the planter 10 may be used a free standing planter or as a hanging planter. When used as a hanging planter, a three-cord hanger (not shown) may be connected to the planter 10 through the openings 36 in the upper container sidewall lip 34. An upper end of the hanger then may be attached to a convenient support member thereabove, for example a roof eve. If hung outside, the planter 10 can be subjected to severe weather wherein the planter 10 may swing about with some intensity. Were the containers 12-16 to disconnect, the lower and middle containers 12, 14 would fall to the ground or like surface below. Upon impact the contained planters and containers 12, 14 could be severely damaged.

Therefore, the integrity of the locking fits 94 between the containers 12-16 is of particular importance and are enhanced by the straps 78. These straps 78 offset structural weakening of the sidewall top edge 30 from formation of the locking slots 76. Note that excessive sidewall flexing could dislodge a fastening cam 72 from a slot 76 and effect an inadvertent container separation with the resulting consequences discussed above.

While an embodiment, uses and advantages of this invention have been shown and discussed, it should be understood that this invention is limited only by the scope of the claims. Those skilled in the art will appreciate that various modifications or changes may be made without departing from the scope and spirit of the invention, and these modifications and changes may result in further uses and advantages.

What I claim is:

1. A modular column planter comprising:
    a lower container having a bottom, an upright post carried by said bottom, a slotted retaining cup formed on an upper end of said upright post, and a sidewall connecting with said bottom and having a top edge defining a top opening of said lower container,
    a middle container having a bottom formed with an opening, an upward extending hollow column and a downward extending lower column extension positioned about said opening, a notch formed in a top edge of said upward extending hollow column, and a sidewall connecting with said bottom and having a top edge defining a top opening of said middle container,
    an upper container having a bottom formed with an opening, an upward extending hollow column and a downward extending lower column extension positioned about said upper container bottom opening, a slot formed in said upper container downward extending lower column extension, and a sidewall connecting with said bottom and having a top edge defining a top opening of said upper container, and
    fastening means carried by said lower container and middle container sidewall top edge and said middle container and upper container bottom to form secure, readily releasable connections between said containers,
    wherein to use said planter, said bottom of said middle container and said bottom of said upper container are selectively fitted respectively in said lower container and said middle container top opening to connect said upper container downward extending lower column extension to said middle container upward extending hollow column and to connect said middle container downward extending lower column extension to said lower container retaining cup and form a watering tube in said planter to distribute water to plant life in said lower container and said middle container with said fastening means holding said containers securely together.

2. A modular column planter as defined claim 1 and further characterized by,
    said bottom of said middle container and said bottom of said upper container each having a vertical rim inwardly offset from said sidewall and connected to such by a ledge, and a raised center section connected to said rim by a depressed portion.

3. A modular column planter as defined by claim 1 and further characterized by,
    said sidewall of said lower container and said sidewall of said middle container each having openings for said plant life to grow outwardly therefrom.

4. A modular column planter as defined by claim 1 and further characterized by including,
    an opening in said watering tube for discharge to said lower container defined in part by said slot in said downward extending lower container retaining cup and a bottom edge Of said middle container lower column extension.

5. A modular column planter as defined by claim 1 and further characterized by including,
    an opening in said watering tube for discharge to said middle container defined in part by said upper container lower column extension slot and said middle container column notch.

6. A modular column planter as defined by claim 2 and further characterized by said fastening means comprising,
    a pair of fastening cams carried respectively on opposite sides of said middle container and said upper container bottom vertical rim,
    a pair of L-like shaped locking slots formed respectively on opposite sides of said top edge of said lower container and said middle container sidewall, and
    straps integrally formed as part of each said container sidewall, each said strap positioned over a respective vertical section of said slot and outwardly offset therefrom,
    wherein said strap promotes structural integrity of said container sidewall top edge to insure continued soundness of interference fits formed between said fastening cams and said locking slots and thereby inhibit an inadvertent separation of said containers of said planter.

7. A modular column planter comprising:

a first container having a bottom connecting with a sidewall, a second container having a bottom connecting with a sidewall, said second container bottom prepared to fit into a top opening of said first container to form a thin parting line at a joinder of said containers, a hollow column carried in said second container to provide a passageway from a top end of said second container column to said first container, and fastening means formed as part of said first container sidewall and said second container bottom, said fastening means including fastening cams for insertion into slots to form readily releasable interference fits therebetween that securely lock said containers together, wherein said planter may be suspended from above in an outside location and there subjected occasionally to severe weather with said planter remaining and appearing as a one-piece structure.

8. A modular column planter as defined by claim 7 and further characterized by, said slots being formed as part of said first container and being reinforced respectively by a strap positioned over a vertical section of said slot with ends of said strap integrally joined to portions of said first container sidewall adjacent to said slot.

9. A modular column planter as defined by claim 7 and further characterized by, said second container column carried on said second container bottom and positioned about an opening in said bottom.

10. A modular column planter particularly adapted for growing plants in an out-of-doors environment, said planter comprising:

a lower container, a middle container having a bottom fitting snugly in a top opening of said lower container, and an inner hollow column carried by said bottom about an opening in said bottom, an upper container having a bottom fitting snugly in a top opening of said middle container, and an inner hollow column carried by said upper container bottom about an opening in said upper container bottom, a watering tube in said planter defined in part by said middle container column being connected to said upper container column, openings in said watering tube to selectively discharge water into said lower container and said middle container, and fastening means carried by said containers to form respective secure, readily releasable connections between said lower container and said middle container and between said middle container and said upper container, wherein, when separated, said containers may be filled with soil for plants to root therein, said containers then placed in a vertical array and there secured by said fastening means to form said column planter with said plants in said lower container and said middle container then receiving near alike amounts of water poured into said watering tube.

* * * * *